(12) United States Patent
Liu

(10) Patent No.: US 10,651,451 B2
(45) Date of Patent: May 12, 2020

(54) BATTERY MODULE

(71) Applicant: Contemporary Amperex Technology Co., Limited, Ningde, Fujian Province (CN)

(72) Inventor: Xiaorong Liu, Ningde (CN)

(73) Assignee: Contemporary Amperex Technology Co., Limited (CN)

( * ) Notice: Subject to any disclaimer, the term of this patent is extended or adjusted under 35 U.S.C. 154(b) by 175 days.

(21) Appl. No.: 16/008,250

(22) Filed: Jun. 14, 2018

(65) Prior Publication Data
US 2019/0097201 A1    Mar. 28, 2019

(30) Foreign Application Priority Data
Sep. 22, 2017 (CN) .................... 2017 2 1226739 U

(51) Int. Cl.
| | | |
|---|---|---|
| *H01M 2/20* | (2006.01) | |
| *H01M 2/26* | (2006.01) | |
| *H01M 10/48* | (2006.01) | |
| *H01M 2/02* | (2006.01) | |
| *H01M 2/10* | (2006.01) | |
| *H01M 10/04* | (2006.01) | |

(52) U.S. Cl.
CPC .......... *H01M 2/202* (2013.01); *H01M 2/024* (2013.01); *H01M 2/1077* (2013.01); *H01M 2/204* (2013.01); *H01M 2/266* (2013.01); *H01M 10/0413* (2013.01); *H01M 10/482* (2013.01); *Y02E 60/122* (2013.01)

(58) Field of Classification Search
CPC .... H01M 2/202; H01M 2/024; H01M 2/1077; H01M 2/204; H01M 2/266; H01M 10/0413; H01M 10/482
See application file for complete search history.

(56) References Cited

FOREIGN PATENT DOCUMENTS

| CN | 1049040377 | * | 9/2015 | ............. H01M 2/34 |
|---|---|---|---|---|
| KP | 10-2009-0030202 | * | 3/2009 | ............. H01M 2/22 |

* cited by examiner

*Primary Examiner* — Helen Oi K Conley
(74) *Attorney, Agent, or Firm* — Forge IP, PLLC

(57) ABSTRACT

A battery module for energy storage is provided, comprising at least one battery unit, including: first and second battery cells comprising first and second electrode tabs as well as third and fourth electrode tabs respectively; first and second connection structures comprising first support/connection portions as well as second support/connection portions respectively, regarding material, first and second support portions being different from materials of first and second connection portions, regarding polarity, the first and second electrode tabs being the same as the third and fourth electrode tabs, both first and fourth electrode tabs being lap-jointed with the first support portion and connected by welding via the first connection portion; and the second electrode tab is lap-jointed with the second support portion and connected by welding with the second connection portion, so as to achieve the welding between electrode tabs with different polarities and expedite the manufacturing schedule for battery module.

10 Claims, 6 Drawing Sheets

BATTERY MODULE

CROSS-REFERENCE TO RELATED APPLICATIONS

The present application claims priority to Chinese Patent Application No. 201721226739.X, filed on Sep. 22, 2017, the content of which is incorporated herein by reference in its entirety.

TECHNICAL FIELD

The present application relates to the technical field of energy storage devices and, particularly, relates to a battery module.

BACKGROUND

Lithium-ion batteries have advantages of high energy capacity, long cycle life, and high efficiency, etc., and have been widely applied in consumable electronic devices, electric vehicles, and energy storage facilities. Currently, due to the reasons of government support, market demand, etc., the development of batteries with high energy density is imperative. A pouch battery becomes a product pursued in the industry, since the pouch battery has advantages of low cost, high energy density, and flexibilities during the assembly process in module.

Generally, a battery module includes a plurality of battery cells, and the battery cell is electrically connected to one another in series. In the prior art, a copper electrode tab and an aluminum electrode tab of the battery cell are connected together by bolting or ultrasonic welding, for the battery module of battery cells being pouch batteries. However, since a difference between a melting point of copper and aluminum is 424° C. and a difference between the coefficient of linear expansion of copper and aluminum is 40%, it is difficult to weld the two together; especially in automatic production, the production progress of the battery module is negatively affected; while for the manner of bolting, the reliability is poor, and more space is occupied, so that a volume energy density of the battery module is relatively low.

SUMMARY

The present application provides a battery module, so as to solve the above problems.

The present application provides a battery module, including at least one battery unit, wherein the battery unit includes:

a first battery cell including a first electrode tab and a second electrode tab;

a second battery cell including a third electrode tab and a fourth electrode tab;

a first connection structure including a first support portion and a first connection portion; a material of the first support portion being different from a material of the first connection portion; and a second connection structure including a second support portion and a second connection portion; a material of the second support portion being different from a material of the second connection portion;

wherein a polarity of the first electrode tab is the same as a polarity of the third electrode tab, a polarity of the second electrode tab being the same as a polarity of the fourth electrode tab, both the first electrode tab and the fourth electrode tab being lap-jointed with the first support portion and connected with each other by welding via the first connection portion; and the second electrode tab is lap-jointed with the second support portion and is connected by welding with the second connection portion.

Preferably, the battery unit further includes a first housing and a second housing, wherein in a same battery unit, the first housing is covered with the second housing, and the first battery cell and the second battery cell are disposed between the first housing and the second housing.

Preferably, the battery unit further includes a third housing, wherein in a same battery unit, the first battery cell and the second battery cell are spaced from each other by the third housing.

Preferably, the battery module includes a plurality of the battery units, wherein two adjacent battery units of the plurality of battery units are a first battery unit and a second battery unit, the third electrode tab of the first battery unit being lap-jointed with the second electrode tab of the second battery unit, and the third electrode tab of the first battery unit being welded to the second electrode tab of the second battery unit by the second connection portion.

Preferably, the third electrode tab includes a first section, a third section, and a second section connecting the first section to the third section, the first section and the second section extending away from the second electrode tab of the same battery unit which the first section and the second section belong to, the third electrode tab of the first battery unit being lap-jointed with the second electrode tab of the second battery unit by the third section.

Preferably, each of the first support portion and the second support portion includes a top surface and a side surface connected with the top surface; each of the first electrode tab, the second electrode tab and the fourth electrode tab includes an extending portion and a bending portion connected with the extending portion, wherein in a same battery unit, the extending portion extends along the side surface, and the bending portion is fitted with the top surface.

Preferably, in a same battery unit, a bending direction of the bending portion of the first electrode tab is opposite to a bending direction of the bending portion of the fourth electrode tab, and a gap is defined between the bending portion of the first electrode tab and the bending portion of the fourth electrode tab.

Preferably, the battery module further includes a circuit board, wherein each of the first support portion and the second support portion is a stepped structure, the stepped structure including a first stepped surface and a second stepped surface; the first stepped surface is closer to the first connection portion or the second connection portion than the second stepped surface, wherein in a same battery unit, the first electrode tab, the second electrode tab, and the fourth electrode tab are lap-jointed with the first stepped surface; and the circuit board is lap-jointed with the second stepped surface.

Preferably, the battery module further includes an electrical connection member, wherein the stepped structure further includes a third stepped surface disposed between the first stepped surface and the second stepped surface, one end of the electrical connection member being connected to the third stepped surface, the other end of the electrical connection member being connected to the circuit board; the first stepped surface is a flat surface, the electrical connection member not going beyond a plane where the first stepped surface is located.

Preferably, a material of the first connection portion and a material of the second connection portion includes nickel;

a material of the first support portion and a material of the second support portion includes aluminum.

The solutions provided by the present application have the following beneficial effects:

In the battery module provided in the present application, the first connection structure and the second connection structure are added, two electrode tabs with different polarities are welded to the first connection portion of the first connection structure and the second connection portion of the second connection structure, respectively. That is, the first electrode tab is connected with the fourth electrode tab by the first connection portion, and the second electrode is connected with the second connection portion, so as to realize a serial connection between the first battery cell and the second battery cell. In this structure, the second electrode tab and the third electrode tab are used as two total output electrodes of the battery unit. Since the first connection portion and the second connection portion are easily welded to the electrode tabs with different polarities, by such a transitional structure, it is realized that the electrode tabs with different polarities are welded, so that the production progress of the battery module and the connection reliability between the electrode tabs are guaranteed. Meanwhile, no additional space in the battery module is occupied, which can improve the energy density of the battery module. In addition, the first support portion and the second support portion function to support the first electrode tab, the second electrode tab, and the fourth electrode tab, so that, especially when the first battery cell and the second battery cell are pouch single batteries, such a structure can improve the connection reliability between the first battery cell and the second battery cell.

It should be interpreted that the general description above and the detailed description below are merely exemplary and cannot limit the present application.

REFERENCE SIGNS

10—first battery unit;
11—first battery cell;
111—first electrode tab;
1111—extending portion;
1112—bending portion;
112—second electrode tab;
12—second battery cell;
121—third electrode tab;
1211—first section;
1212—second section;
1213—third section;
122—fourth electrode tab;
13—first connection structure;
131—first support portion;
1311—top surface;
1312—side surface;
1313—first stepped surface;
1314—second stepped surface;
1315—third stepped surface;
132—first connection portion;
1321—first welding seam;
1322—second welding seam;
1323—third welding seam;
14—second connection structure;
141—second support portion;
142—second connection portion;
1421—fourth welding seam;
1422—fifth welding seam;
15—first housing;
151—clamping portion;
16—second housing;
17—third housing;
20—second battery unit;
30—circuit board;
40—electrical connection member; and
50—pad.

The accompanying drawings herein are incorporated into the specification and constitute a part of the specification, which illustrate the embodiments of the present application and are used to explain the principles of the present application together with the specification.

DESCRIPTION OF EMBODIMENTS

The present application is further described in detail by the specific embodiments with reference to the accompanying drawings.

Figure 1:
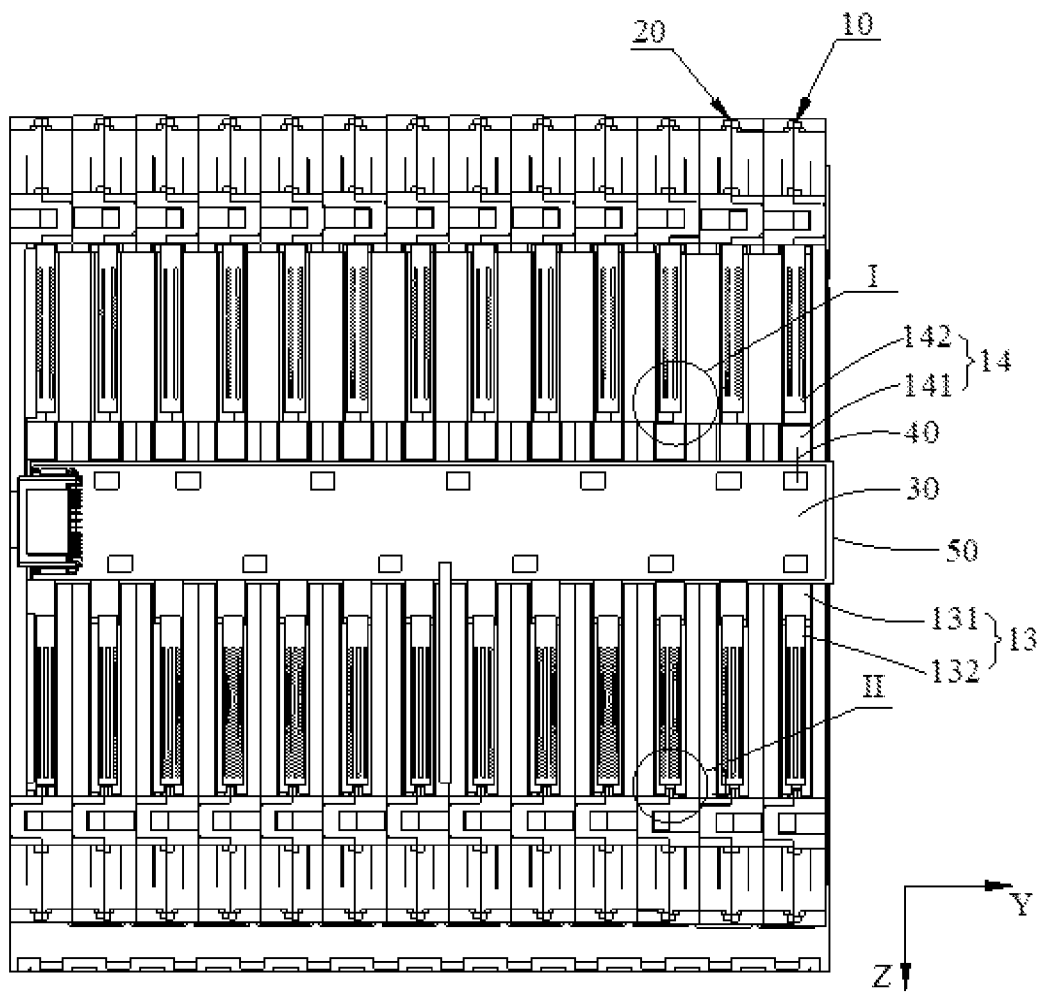
FIG. 1 illustrates a structural schematic view of a battery module according to an embodiment of the present application.

As shown in FIGS. 1-7, an embodiment of the present application provides a battery module, including at least one battery unit (such as a first battery unit 10 or a second battery unit 20), i.e. the battery module may include one, six, nine, or ten battery units. For example, the battery module includes thirteen battery units as shown in FIG. 1. Taking the first battery unit 10 as an example, each battery unit is described in details as follows.

Figure 2:
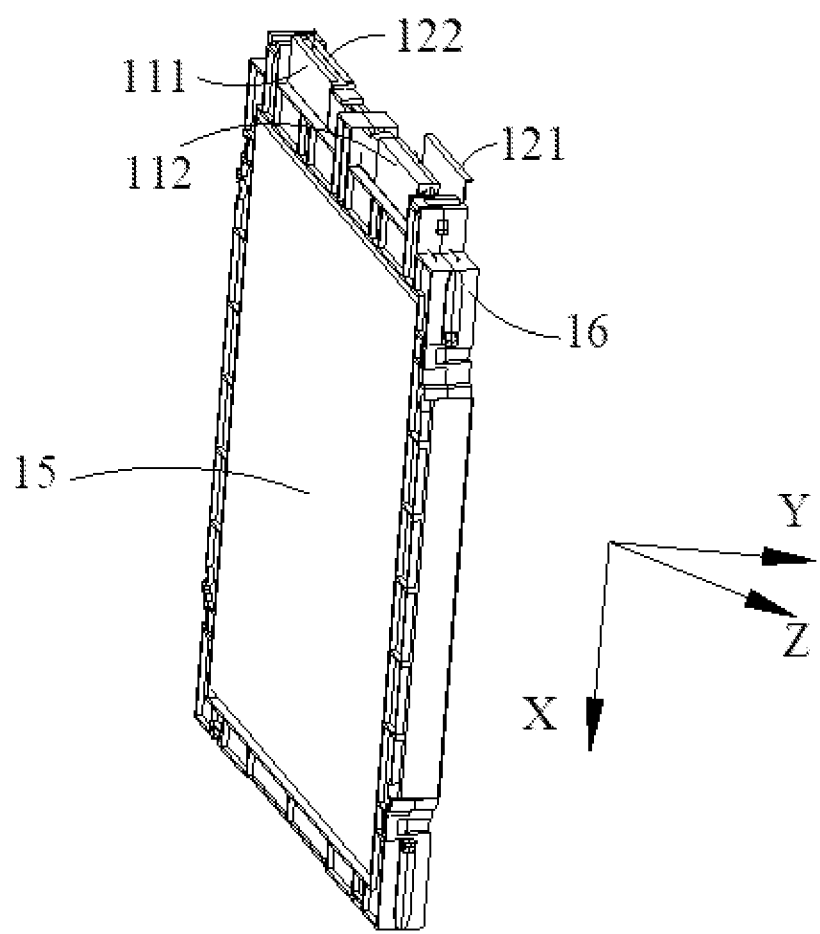
FIG. 2 illustrates a structural schematic view of a battery unit in a battery module according to an embodiment of the present application.
Figure 3:
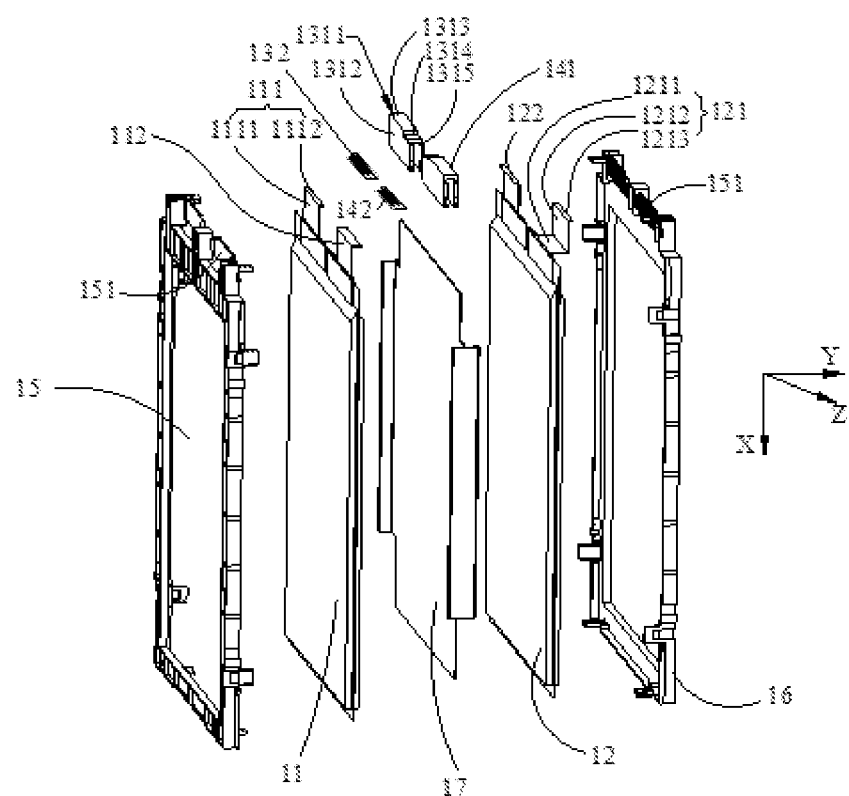
FIG. 3 illustrates an exploded schematic view of a battery unit in a battery module according to an embodiment of the present application.

As shown in FIGS. 2-3, the battery unit includes a first battery cell 11, a second battery cell 12, a first connection structure 13, and a second connection structure 14. Each of the first battery cell 11 and the second battery cell 12 can be a single pouch battery. The first battery cell 11 includes a first electrode tab 111 and a second electrode tab 112. The second battery cell 12 includes a third electrode tab 121 and a fourth electrode tab 122. The first connection structure 13 includes a first support portion 131 and a first connection portion 132, and a material of the first support portion 131 is different from a material of the first connection portion 132, so that preferably the first support portion 131 may be separated from the first connection portion 132 before being assembled. The second connection structure 14 includes a second support portion 141 and a second connection portion 142, and a material of the second support portion 141 is different from a material of the second connection portion 142, so that preferably the second support portion 141 may be separated from the second connection portion 142 before being assembled. The configuration about the first and second connection portions 141 and 142 is clearly shown in FIG. 3 but cannot be seen in FIGS. 2 and 4. A polarity of the first electrode tab 111 is the same as a polarity of the third electrode tab 121, a polarity of the second electrode tab 112 is the same as a polarity of the fourth electrode tab 122. Each of the first electrode tab 111 and the fourth electrode tab 122 is lap-jointed with the first support portion 131, and the first electrode tab 111 and the fourth electrode tab 122 are connected to each other by welding via the first connection portion 132. The second electrode tab 112 is lap-jointed with the second support portion 141, and is welded to the second connection portion 142. Thus, the first battery cell 11 and the second battery cell 12 forms a serial structure, a total output electrode of the battery unit is the second electrode tab 112 and the third electrode tab 121, i.e., the second electrode tab 112 is a first total output electrode of the battery unit, and the third electrode tab 121 is a second total output electrode of the battery unit.

In the above described battery unit, the first connection structure 13 and the second connection structure 14 are added, in the first battery cell 11 and the second battery cell 12, two electrode tabs with different polarities are welded to the first connection portion 132 of the first connection structure 13 and the second connection portion 142 of the second connection structure 14, respectively. That is, the first electrode tab 111 is connected with the fourth electrode tab 122 by the first connection portion 132, and the second electrode 112 is connected with the second connection portion 142, so as to realize a serial connection between the first battery cell 11 and the second battery cell 12. In this structure, the second electrode tab 112 and the third electrode tab 121 are used as two total output electrodes of the battery unit, respectively. Apparently, since the first connection portion 132 and the second connection portion 142 are easily welded to the electrode tabs with different polarities, by such a transitional structure, it is realized that the electrode tabs with different polarities are welded, so that the production progress of the battery module and the connection reliability between the electrode tabs are guaranteed. Meanwhile, no additional space in the battery module is occupied, which can improve the energy density of the battery module. In addition, the first support portion 131 and the second support portion 141 function as supporting the first electrode tab 111, the second electrode tab 112, and the fourth electrode tab 122, so that, especially, when the first battery cell 11 and the second battery cell 12 are pouch single batteries, such a structure can improve the connection reliability between the first battery cell 11 and the second battery cell 12.

In the above described structure, if the first battery cell 11 and the second battery cell 12 are pouch single batteries, it is difficult to assemble the battery units into module. Thus, each battery unit further includes a first housing 15 and a second housing 16, in a same battery unit, the first housing 15 is covered with the second housing 16, and the first battery cell 11 and the second battery cell 12 are disposed between the first housing 15 and the second housing 16. Hardness of the first housing 15 and the second housing 16 is relatively great, so that, through packaging the first battery cell 11 and the second battery cell 12 by the first housing 15 and the second housing 16, the pouch battery cell can be converted to a shell battery, which facilitates arrangement of battery units.

The first housing 15 and the second housing 16 can be clamped together by their clamping structure, or can be connected together by screw connection. Or, both the first housing 15 and the second housing 16 are connected with the first support portion 131 and the second support portion 141, for example, each of the first housing 15 and the second housing 16 includes a clamping portion 151, and the clamping portion 151 can be in a plate-like structure. A clamping groove can be defined in each of the first support portion 131 and the second support portion 141, for example, the first support portion 131 and the second support portion 141 have a U-shaped structure, and the two clamping portions 151 of the first housing 15 and the second housing 16 are inserted into the U-shaped structure. In a preferred embodiment, the first housing 15 is clamped with the second housing 16 by their clamping structure and, at the same time, by the first support portion 131 and the second support portion 141.

Optionally, the battery unit further includes a third housing 17, the first battery cell 11 and the second battery cell 12 are spaced from each other by the third housing 17, i.e., a space between the first battery cell 11 and the second battery cell 12 are separated into two chambers by the third housing 17, so that the first battery cell 11 and the second battery cell 12 are placed in the two chambers, respectively. Thus, it is prevented that the first battery cell 11 and the second battery cell 12 are squeezed by each other, to guarantee the safety of the battery module.

A protruding hole is defined in each of the first housing 15 and the second housing 16, and the first electrode tab 111, the second electrode tab 112, the third electrode tab 121, and the fourth electrode tab 122 protrude outside from the first housing 15 or the second housing 16 through the protruding holes, to facilitate that the connection between each of the above described electrode tabs and the first connection portion 132 or the second connection portion 142.

Generally, each battery unit forms a cuboid-like structure to be similar to a structure of the shell battery, and to facilitate arrangement of the battery units in a box of the battery module, the cuboid structures are arranged along their width direction (direction Y in FIGS. 1-4).

Further, each of the first support portion 131 and the second support portion 141 includes a top surface 1311 and a side surface 1312 connected to the top surface 1311, each of the first electrode tab 111, the second electrode tab 112, and the fourth electrode tab 122 includes an extending portion 1111 and a bending portion 1112 connected to the extending portion 1111. In a same battery unit, the extending portion 1111 extends along the side surface 1312, the bending portion 1112 is fitted with the top surface 1311. Optionally, the side surface 1312 is set along a height direction of the first battery cell 11; the top surface 1311 is perpendicular to the height direction, and when the height direction is a vertical direction, the top surface 1311 is located above the first battery cell 11. Thus, the first electrode tab 111, the second electrode tab 112, and the fourth electrode tab 122 firstly extend along the side surface 1312, and then bend to form the bending portion 1112, to better fix the first battery cell 11 and the second battery cell 12. A welding position of the first electrode tab 111, the second electrode tab 112, the third electrode 121, and the fourth electrode tab 122 is generally a flat structure, thus the top surface 1311 and the side surface 1312 are selected to be flat structures, to improve the fitness between each electrode tab and the top surface 1311 and then improve the reliability of the connection.

Figure 6:
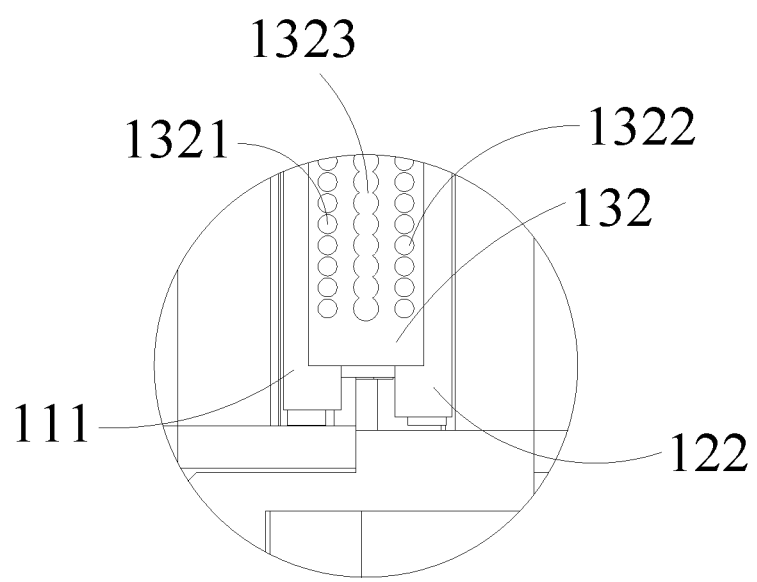
FIG. 6 illustrates an enlarged view of portion II shown in FIG. 1.

In a same battery unit, a bending direction of the bending portion 1112 of the first electrode tab 111 is opposite to a bending direction of the bending portion 1112 of the fourth electrode tab 122, and a gap is defined between the bending portion 1112 of the first electrode tab 111 and the bending portion 1112 of the fourth electrode tab 122. As shown in FIG. 6, the first support portion 131 is placed between the extending portion 1111 of the first electrode tab 111 and the extending portion 1111 of the fourth electrode tab 122, and the first electrode tab 111 and the fourth electrode tab 122 bend from opposite sides of the first support portion 131 toward a middle portion thereof. When the clamping portion 151 is provided, the protruding hole of the first housing 15 is defined at an external side of the clamping portion 151 (i.e., a side of the clamping portion 151 close to the external side of the first housing 15), the protruding hole of the second housing is defined at an external side of the clamping portion 151 (i.e., a side of the clamping portion 151 close to the external side of the second housing 16), to facilitate that the electrode tabs bend from the external side of the first support portion 131 or the second support portion 141 toward the top surface to form the lap joint, and no through hole is needed to be defined in the first support portion 131 and the second support portion 141, so that the strength of the first support portion 131 and the second support portion 141 can be guaranteed.

For further guaranteeing the reliability of the connection between the first electrode tab 111 and the fourth electrode tab 122, a bending length L of the bending portion 1112 of the first electrode tab 111 and a bending length L of the bending portion 1112 of the fourth electrode tab 122 can be one third of the first support portion 131. As shown in FIG. 6, the connection structure between the first electrode tab 111 and the fourth electrode tab 122 is illustrated. Along a height direction of the battery unit in FIG. 6 (direction X in FIGS. 1-3), the first connection portion 132, the bending portion 1112 of the first electrode tab 111, the bending portion 1112 of the fourth electrode tab 122, and the first support portion 131 are provided sequentially. The first electrode tab 111 is connected with the first connection portion 132 by a first welding seam 1321. The fourth electrode tab 122 is connected with the first connection portion 132 by a second welding seam 1322, and the first connection portion 132 is connected with the first support portion 131 by a third welding seam 1323.

In the above described structure, the first electrode tab 111 and the third electrode tab 121 can be negative electrode tabs, and the second electrode tab 112 and the fourth electrode tab 122 can be positive electrode tabs. Generally, the positive electrode tab is an aluminum electrode tab, the negative electrode tab is a copper electrode tab, accordingly, the first total output electrode is a total positive electrode, and the second total output electrode is a total negative electrode. For further lowering the difficulty of welding and realizing the automatic production of the battery module, a material of the first connection portion 132 and the second connection portion 142 includes nickel, a material of the first support portion 131 and the second support portion 141 includes aluminum. Thus, the copper electrode tab and the aluminum electrode tab can be welded to the first connection portion 132 and the second connection portion 142, respectively. In addition, the first support portion 131 made of aluminum and the second support portion 141 made of aluminum can decrease the cost of the first connection structure 13 and the second connection structure 14.

Further, each of the first connection portion 132 and the second connection portion 142 can be in a sheet-like structure, for facilitating the copper electrode tab and the aluminum electrode tab being welded to the first connection portion 132 and the second connection portion 142.

Figure 4:
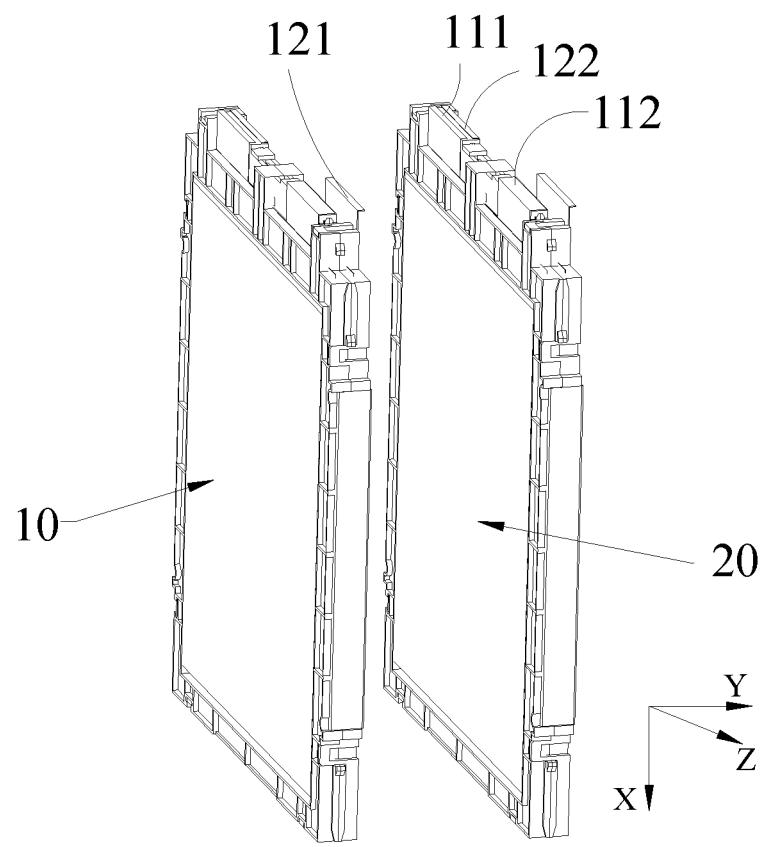
FIG. 4 illustrates a structural schematic view of two adjacent battery units in a battery module according to an embodiment of the present application.

Generally, a plurality of the battery units is provided, and two adjacent battery units are a first battery unit 10 and a second battery unit 20, respectively. As shown in FIG. 4, the third electrode tab 121 of the first battery unit 10 is lap-jointed with the second electrode tab 112 of the second battery unit 20, and is connected to the second electrode tab 112 of the second battery unit 20 by welding via the second connection portion 142. That is, the second total output electrode of the first battery unit 10, the first total output electrode of the second battery unit 20 are welded to the second connection portion 142 of the second battery unit 20, respectively, so that the first battery unit 10 and the second battery unit 20 are connected in series. A transitional structure that the two adjacent battery units are indirectly connected by the second connection structure 14 can increase convenience of the connection and further facilitate the automatic production of the battery module.

The third electrode tab 121 includes a first section 1211, a second section 1212, and a third section 1213, wherein the second section 1212 connects the first section 1211 to the third section 1213. The first section 1211 and the third section 1213 extend away from the second electrode tab 112 of the same battery unit which the first section 1211 and the second section 1212 belong to. That is, the third electrode tab 121 is a bending structure, and bends along a direction away from the side surface 1312 of the same battery unit which the third electrode tab 121 belongs to and then bends along the top surface 1311 of the second support portion 141 away from the second electrode tab 112, thereby forming the first section 1211, the second section 1212, and the third section 1213. When the adjacent two battery units are connected in series, the third electrode tab 121 of the first battery unit 10 is lap-jointed with the second electrode tab 112 of the second battery unit 20 by the third section 1213 of the third electrode tab 121. In such way, it is convenient that the third electrode tab 121 used as the second total output electrode is connected to another battery unit. Specifically, when each battery unit forms a cuboid-like structure, an extending length of the first section 1211 can be equal to a thickness of one battery unit (as shown in FIG. 4, a thickness direction is a width direction of the cuboid structure, i.e., direction Y).

When the first electrode tab 111, the second electrode tab 112, the third electrode tab 121, and the fourth electrode tab 122 do not fit onto the first support portion 131 or the second support portion 141, an included angle between the extending portion 1111 and the bending portion 1112, an included angle between the first section 1211 and the second section 1212, and an included angle between the second section 1212 and the third section 1213 can be in a range of 87°-90°, such as 87°, 88°, and 90°, so that when the first electrode tab 111, the second electrode tab 112, the third electrode tab 121, and the fourth electrode tab 122 fit onto the first support portion 131 or the second support portion 141, the fitness is improved.

Figure 5:
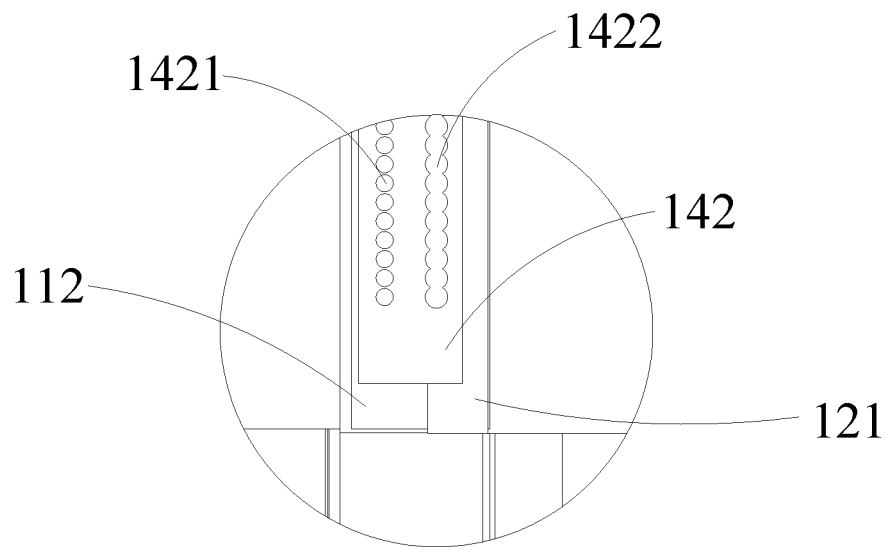
FIG. 5 illustrates an enlarged view of portion I shown in FIG. 1.

As shown in FIG. 5, the connection structure of the third electrode tab 121 of the first battery unit 10 and the second electrode tab 112 of the second battery unit 20 is illustrated. The second connection portion 142 of the second battery unit 20, the bending portion 1112 of the second electrode tab 112 of the second battery unit 20, the third section 1213 of the third electrode tab 121 of the first battery unit 10, and the second support portion 141 of the second battery unit 20 are provided sequentially along a height direction of the battery unit (direction X shown in FIGS. 1-4). The second electrode tab 112 and the second connection portion 142 are connected by the fourth welding seam 1421, and the third electrode tab 121 and the second connection portion 142 are connected by the fifth welding seam 1422. Generally, the second electrode tab 112 is an aluminum electrode tab, and a material of the second support portion 141 is also aluminum, so that when welding the second electrode tab 112, the second connection portion 142, the second electrode tab 112, the second support portion 141 of the second battery unit 20 are welded by the fourth welding seam 1421.

Figure 7:
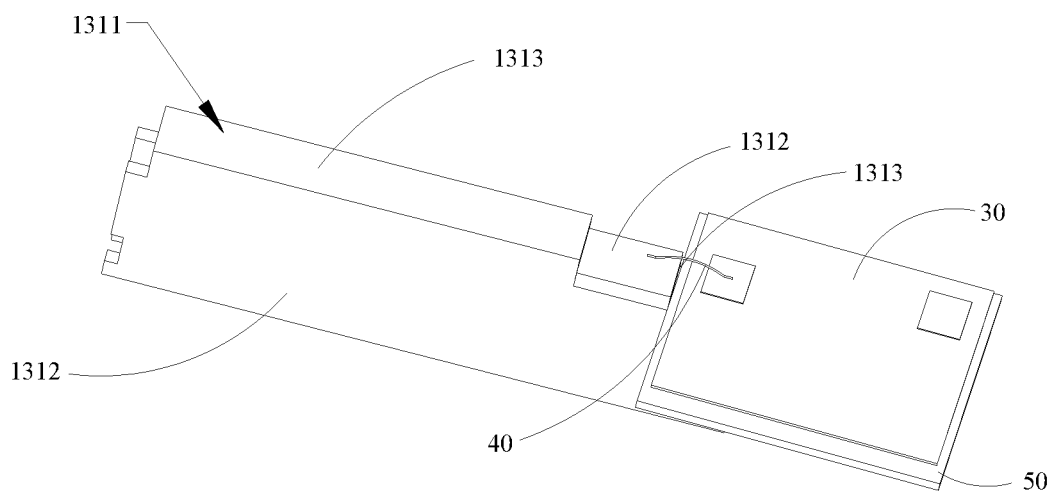
FIG. 7 illustrates a structural schematic view of a stepped structure in a battery module according to an embodiment of the present application.

In addition, the battery module further includes a circuit board 30, as shown in FIGS. 1 and 7, to connect each battery unit with other components of the battery module or other devices outside the battery module. Generally, the circuit board 30 is placed on the first support portion 131 and the second support portion 141.

Specifically, each of the first support portion 131 and the second support portion 141 is a stepped structure, as shown in FIG. 7, the stepped structure includes a first stepped surface 1313 and a second stepped surface 1314. That is, the top surface 1311 includes the first stepped surface 1313 and the second stepped surface 1314. The first stepped surface 1313 is closer to the first connection portion 132 or the second connection portion 142 than the second stepped surface 1314. In a same battery unit, the first electrode tab 111, the second electrode tab 112, and the fourth electrode tab 122 are lap-jointed with the first stepped surface 1313; and the circuit board 30 is lap-jointed with the second stepped surface 1314, to prevent the first electrode tab 111, the second electrode tab 112, and the fourth electrode tab 122 from directly contacting with the circuit board 30.

Furthermore, the battery module further includes an electrical connection member 40, the electrical connection member 40 can be an aluminum wire for bonding. The circuit board 30 is connected with the stepped structure by the electrical connection member 40. As shown in FIG. 7, the stepped structure further includes a third stepped surface 1315 placed between the first stepped surface 1313 and the second stepped surface 1314. One end of the electrical connection member 40 is connected to the third stepped surface 1315, the other end of the electrical connection member 40 is connected to the circuit board 30. That is, the third stepped surface 1315 is connected to the circuit board 30 by the electrical connection member 40, and the first stepped surface 1313 is a flat surface, the electrical connection member 40 does not go beyond the plane where the first stepped surface 1313 is located. That is, along a length direction of the battery unit (direction Z in FIGS. 1-4, i.e., a direction perpendicular to direction X and direction Y), a projection of the electrical connection member 40 is located between a projection of the first stepped surface 1313 and a projection of the third stepped surface 1315, or an edge of the projection of the electrical connection member 40 away from the second stepped surface 1314 overlaps with the projection of the first stepped surface 1313, so that by adding the third stepped surface 1315, a height difference between a portion of the stepped structure connected with the electrical connection member 40 and the circuit board 30 is decreased as much as possible, to alleviate a bending angle of the electrical connection member 40.

Optionally, the battery module further includes a pad 50 placed between the circuit board 30 and the second stepped surface 1314, to prevent short circuit between components on the circuit board 30 and the first support portion 131 or the second support portion 141 by contacting. At this time, the height difference between the second stepped surface 1314 and the third stepped surface 1315 is equal to a sum of thickness of the circuit board 30 and the pad 50, the height difference between the first stepped surface 1313 and the second stepped surface 1314 is equal to the height of the electrical connection member 40 (a height direction is direction X in FIGS. 1-4).

It should be noted that, welding in the embodiments as above described can be ultrasonic welding.

The above are merely preferred embodiments of the present application, which are not used to limit the present application. For those skilled in the art, the present application can have various changes and modifications. All the modifications, equivalent substitutions and improvements within the principles of the present application shall fall into the protection scope of the present application.

What is claimed is:

1. A battery module, comprising at least one battery unit, wherein the battery unit comprises:
   a first battery cell comprising a first electrode tab and a second electrode tab;
   a second battery cell comprising a third electrode tab and a fourth electrode tab;
   a first connection structure comprising a first support portion and a first connection portion; a material of the first support portion being different from a material of the first connection portion; and
   a second connection structure comprising a second support portion and a second connection portion; a material of the second support portion being different from a material of the second connection portion;
   wherein a polarity of the first electrode tab is the same as a polarity of the third electrode tab, a polarity of the second electrode tab being the same as a polarity of the fourth electrode tab, both the first electrode tab and the fourth electrode tab being lap-jointed with the first support portion and connected with each other by welding via the first connection portion; and the second electrode tab is lap-jointed with the second support portion and is connected by welding with the second connection portion.

2. The battery module according to claim 1, wherein the battery unit further comprises a first housing and a second housing,
   wherein in a same battery unit, the first housing is covered with the second housing, and the first battery cell and the second battery cell are disposed between the first housing and the second housing.

3. The battery module according to claim 2, wherein the battery unit further comprises a third housing,
   wherein in a same battery unit, the first battery cell and the second battery cell are spaced from each other by the third housing.

4. The battery module according to claim 1, wherein the battery module comprises a plurality of the battery units, wherein two adjacent battery units of the plurality of battery units are a first battery unit and a second battery unit, the third electrode tab of the first battery unit being lap-jointed with the second electrode tab of the second battery unit, and the third electrode tab of the first battery unit being welded to the second electrode tab of the second battery unit by the second connection portion.

5. The battery module according to claim 4, wherein the third electrode tab comprises a first section, a third section, and a second section connecting the first section to the third section, the first section and the second section extending away from the second electrode tab of the same battery unit which the first section and the second section belong to, the third electrode tab of the first battery unit being lap-jointed with the second electrode tab of the second battery unit by the third section.

6. The battery module according to claim 1, wherein each of the first support portion and the second support portion comprises a top surface and a side surface connected with the top surface; each of the first electrode tab, the second electrode tab and the fourth electrode tab comprises an extending portion and a bending portion connected with the extending portion, wherein in a same battery unit, the extending portion extends along the side surface, and the bending portion is fitted with the top surface.

7. The battery module according to claim 6, wherein in a same battery unit, a bending direction of the bending portion of the first electrode tab is opposite to a bending direction of the bending portion of the fourth electrode tab, and a gap is defined between the bending portion of the first electrode tab and the bending portion of the fourth electrode tab.

8. The battery module according to claim 1, further comprising a circuit board, wherein each of the first support portion and the second support portion is a stepped structure, the stepped structure comprising a first stepped surface and a second stepped surface; the first stepped surface is closer to the first connection portion or the second connection portion than the second stepped surface, wherein in a same battery unit, the first electrode tab, the second electrode tab, and the fourth electrode tab are lap-jointed with the first stepped surface; and the circuit board is lap-jointed with the second stepped surface.

9. The battery module according to claim 8, further comprising an electrical connection member, wherein the stepped structure further comprises a third stepped surface disposed between the first stepped surface and the second stepped surface, one end of the electrical connection member being connected to the third stepped surface, the other end of the electrical connection member being connected to the circuit board; the first stepped surface being a flat surface, the electrical connection member not going beyond a plane where the first stepped surface is located.

10. The battery module according to claim 1, wherein a material of the first connection portion and a material of the second connection portion comprises nickel; a material of the first support portion and a material of the second support portion comprises aluminum.

\* \* \* \* \*